United States Patent
Nichols et al.

(10) Patent No.: US 11,209,456 B2
(45) Date of Patent: Dec. 28, 2021

(54) INTEGRATED MOVEMENT MEASUREMENT UNIT

(71) Applicant: Woven Planet North America, Inc., Los Altos, CA (US)

(72) Inventors: Jonathan Oliver Nichols, San Francisco, CA (US); Mayur Nitinbhai Shah, Pleasanton, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 324 days.

(21) Appl. No.: 16/283,529

(22) Filed: Feb. 22, 2019

(65) Prior Publication Data
US 2020/0271689 A1  Aug. 27, 2020

(51) Int. Cl.
| | |
|---|---|
| *G01P 21/00* | (2006.01) |
| *G01S 7/497* | (2006.01) |
| *G01S 17/86* | (2020.01) |
| *G01C 21/16* | (2006.01) |
| *G01C 25/00* | (2006.01) |

(52) U.S. Cl.
CPC .......... *G01P 21/00* (2013.01); *G01C 21/1652* (2020.08); *G01S 7/497* (2013.01); *G01S 7/4972* (2013.01); *G01S 17/86* (2020.01); *G01C 21/165* (2013.01); *G01C 25/00* (2013.01); *G01C 25/005* (2013.01)

(58) Field of Classification Search
None
See application file for complete search history.

(56) References Cited

U.S. PATENT DOCUMENTS

| | | | |
|---|---|---|---|
| 10,151,588 B1* | 12/2018 | Singh | G01S 17/86 |
| 2011/0218733 A1* | 9/2011 | Hamza | G01C 21/165 |
| | | | 701/469 |
| 2013/0002857 A1* | 1/2013 | Kulik | G01C 17/38 |
| | | | 348/135 |
| 2015/0006074 A1* | 1/2015 | Le Scouarnec | G01C 21/20 |
| | | | 701/468 |
| 2016/0082597 A1* | 3/2016 | Gorshechnikov | B25J 9/1697 |
| | | | 700/253 |
| 2016/0377437 A1* | 12/2016 | Brannstrom | G05D 1/0278 |
| | | | 701/501 |
| 2017/0023665 A1* | 1/2017 | Guo | G01S 17/86 |
| 2018/0365533 A1* | 12/2018 | Sathyanarayana | G06N 3/04 |
| 2020/0142426 A1* | 5/2020 | Gist, IV | G05D 1/0231 |

\* cited by examiner

*Primary Examiner* — Arleen M Vazquez
*Assistant Examiner* — Terence E Stifter, Jr.
(74) *Attorney, Agent, or Firm* — Christopher G. Darrow; Darrow Mustafa PC

(57) ABSTRACT

In one embodiment, a system includes an inertial measurement unit, a lidar sensor, and one or more processors configured to perform operations. The operations include receiving data from the lidar sensor. The operations include determining movement data based on the data received from the lidar sensor. The operations include receiving data from the inertial measurement unit. The operations include determining, based on the movement data and the data received from the inertial measurement unit, one or more calibration factors for the inertial measurement unit. The operations include applying the one or more calibration factors to a measurement received from the inertial measurement unit.

20 Claims, 14 Drawing Sheets

INTEGRATED MOVEMENT MEASUREMENT UNIT

BACKGROUND

Vehicle manufacturers, and after-market vehicle equipment manufacturers, may provide many types of sensors to be used with human-driven and autonomous vehicles. These sensors come in a variety of form factors and have a wide variety of uses, from vehicle safety and security, to enabling autonomous activity, and many more. Ensuring the accuracy of the data measured by these sensors is therefore critical to enabling many vehicle features available today and in the future. One particular challenge faced while ensuring the accuracy of the data is proper calibration of the sensors, both initially and after a period of use.

DESCRIPTION OF EXAMPLE EMBODIMENTS

Figure 1:
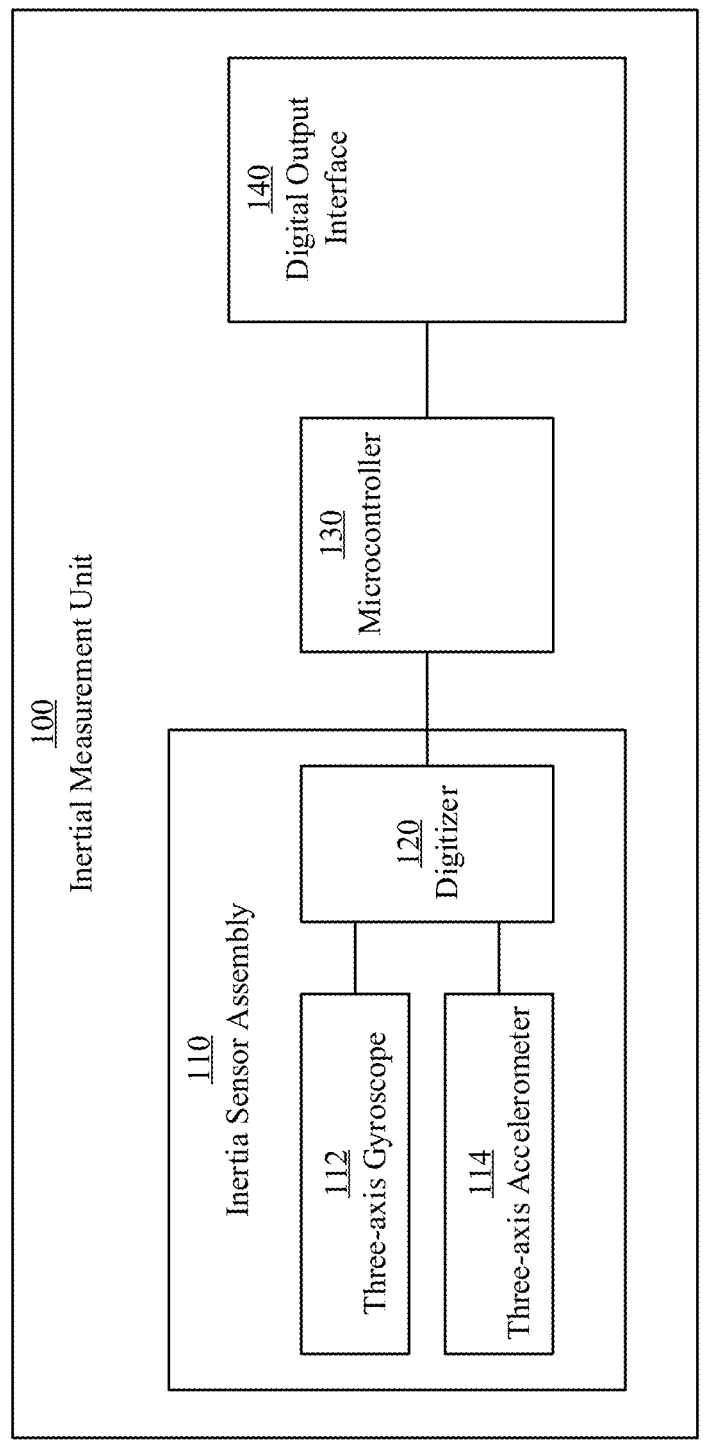
FIG. 1 illustrates an example schematic diagram of an inertial measurement unit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Vehicle positioning systems use multiple sensors to detect movement and position of a vehicle and to gather information about the environment surrounding the vehicle. An autonomous vehicle may use multiple sensors to perform a method known as simultaneous localization and mapping, or "SLAM" to map the environment surrounding the autonomous vehicle and determine how the autonomous vehicle should proceed. The signals received from the various sensors are used by a central controller of the autonomous vehicle as input to the autonomous driving algorithms. Sensors may also be used by human-operated vehicles to provide additional information to a driver. For example, sensors may determine if the vehicle is at risk of hitting an object and take appropriate action. Depending on the context, appropriate action may be to warn the driver of the existence and location of the object, or even to take corrective action (e.g., applying the brakes or adjusting the steering wheel). As vehicles become more automated, the accuracy of the data received by the systems controlling the vehicles is paramount.

As an example, a vehicle may include sensors for detecting the movement of the vehicle by measuring a change in the forces exerted on the vehicle. One such sensor is an inertial measurement unit, "IMU." An IMU is typically capable of measuring translational, rotational, or magnetic forces exerted on the IMU (or an object to which the IMU is fixed). As another example, a vehicle may include sensors for gathering data about the environment around it. One such sensor is a lidar sensor. A lidar sensor is an effective tool for measuring the distances to objects at a high rate using the time of flight of light pulses. IMUs and lidar sensors may be used together, with the data output by each being used by a vehicle positioning system. To be used together, the components must be physically calibrated so that the vehicle positioning system is aware of the distances between components, and how that may impact the output. The components must also be synchronized so that timing differences between the output of data are resolved. Other demands, such as ensuring adequate power delivery, further complicate the use of multiple sensors, including IMUs and lidar sensors, in a sensor array of a vehicle.

FIG. 1 illustrates a component diagram of an example IMU 100. The IMU 100 includes an inertia sensor assembly 110. The inertia sensor assembly 110 includes the sensors capable of detecting the forces of interest. The inertia sensor assembly 110 includes a three-axis gyroscope 112. The three-axis gyroscope 112 detects rotational forces, or rates of rotation, experienced by the IMU around three (approximately orthogonal) axes. These rotations are known as pitch, roll, and yaw. The inertia sensor assembly 110 further includes a three-axis accelerometer 114. The three-axis accelerometer 114 detects translational movement or forces that create a linear acceleration on the IMU expressed in terms of three (approximately orthogonal) axes. The axes are commonly referred to as the x-axis, y-axis, and z-axis. Once activated, the sensors of the inertia sensor assembly 110, detect forces experienced by the IMU 100. The signals are sent through a digitizer 120, so that they can be interpreted by a microcontroller 130. The microcontroller 130 may perform several functions, including additional digital signal processing, data sanitization, and other data processing. The microcontroller 130 then prepares data to be offered through a digital output interface 140, where the data can be used by other components of a system comprising the IMU (e.g., a vehicle computer system).

Data from an IMU may be used independently or in combination with data generated by other system components. IMU data includes information on translational acceleration and rotation and may be used to confirm speed or acceleration values received from a speedometer of a vehicle. IMUs may be also used, for example, to augment or as backup to vehicle navigation systems. An IMU may be used as a component of an inertial navigation system that uses the translational acceleration and rotation rate detected by the IMU to determine the location and orientation of the IMU given a starting point and a map. For example, an inertial navigation system may include a map of the environment surrounding a vehicle. The IMU may determine that the vehicle experienced an acceleration in one direction of 2 m/s$^2$ for one second, and then ten seconds later, experienced an acceleration in the same direction of −2 m/s$^2$ for one second (e.g., the vehicle accelerated, travelled, and decelerated). Using this acceleration information, the inertial navigation system can determine that the vehicle traveled 22 meters. Similar principles can be used to determine the orientation of a vehicle after is experiences rotation about one or more axes. Inertial navigation systems may be especially useful in environments where satellite-based location systems (e.g., GPS) are periodically or permanently unavailable.

Figure 2:
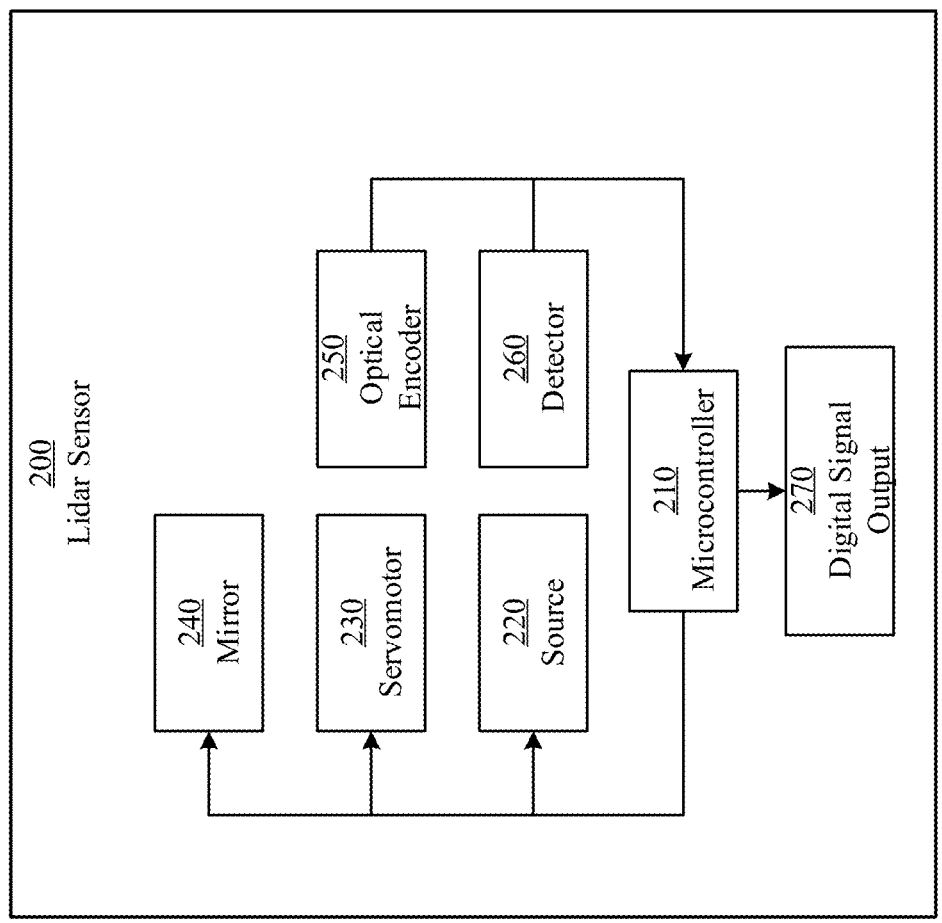
FIG. 2 illustrates an example schematic diagram of a lidar sensor.

FIG. 2 illustrates a component diagram of an example lidar sensor 200. The lidar sensor 200 includes a microcontroller 210 that controls all the lidar sensor's actions. The lidar sensor 200 includes a source 220 and detector 260. The source 220 (e.g., a laser device), at the direction of the microcontroller 210, emits a signal at a specific rate. A servomotor 230, rotates mirror 240 about a shaft or axle. The mirror 240 redirects the output of the source 220 into the environment surrounding the lidar sensor 200. The mirror 240 also directs reflections, as the output bounces off objects in the environment, to the detector 260. The microcontroller 210 interprets the signals presented by the detector 260 and prepares them for output to other components via the digital signal output 270. To ensure that the reflections detected by detector 260 can be accurately interpreted by the microcontroller 210, it is imperative that the rotation rate of the mirror 240 and the signal pattern emitted by the source 220 are known and synchronized. To that end, the rotation rate supplied by the servomotor 230 is specified by the microcontroller 210. However, for a variety of reasons (e.g., wear, power fluctuations, manufacturing defects or tolerances), the rotational rate actually supplied by the servomotor 230 may not match the rate specified by the microcontroller 210. To detect variations, the lidar sensor 200 may include an optical encoder 250 to detect the actual rate of rotation supplied by the servomotor 230. The optical encoder 250 may comprise an optical sensor capable of detecting rotations of the axle (e.g., by detecting a marking on the axle as it passes in front of the optical encoder 250). This value may be passed to the microcontroller 210 so that the microcontroller may compensate for deviations from the specified rate of rotation.

In particular embodiments, multiple sensors may be included in a single housing. This housing may be referred to as an integrated movement measurement unit. Significant benefits may be recognized as a result of including IMU and lidar sensors in such an arrangement. One benefit includes a simplification of power delivery requirements. When multiple sensors are included in the same housing, a single source can provide the power to all included sensors. Power will be apportioned to the devices using wiring within the housing. The wiring can be laid before the sensor housing is attached to a vehicle, removing steps from a vehicle assembly line. Such a unified housing can more easily be attached as an after-market component.

Another benefit involves the timing of data received from the sensors. Sensors within an integrated movement measurement unit may be used by autonomous and non-autonomous vehicles to create and analyze a model of the environment around it. The model and analysis are most accurate when a vehicle positioning system can correlate data received from one sensor with data received from another. For example, a vehicle positioning system may correlate reflections detected by a lidar sensor 200 with gyroscope and accelerometer feedback from an IMU 100 to conclude that a sudden jerking movement was caused by the vehicle driving over a pot hole in the road and not the vehicle striking a curb. Because IMU and lidar sensor data may be generated on a sub-second basis, it must be tied to a synchronizing signal, for example, a clock signal provided by a clock generator of a vehicle positioning system. This may be delivered to the sensor housing and distributed accordingly therein. By incorporating multiple sensors into a single integrated movement measurement unit, the clock signal can more easily be shared by the components thereof, including by one or more IMUs and lidar sensors. Like power, the wiring for the clock signal can be laid prior to installing the housing on a vehicle, simplifying manufacturing and calibration steps.

Another set of benefits relates to the calibration of the components of an integrated movement measurement unit. As stated previously, many types of sensors are included in autonomous and non-autonomous vehicles. In autonomous vehicles, these sensors are used by the vehicle computing system to support self-driving features. In non-autonomous vehicles, these sensors may be used as safety measures (i.e., to prevent accidental collisions) or to provide semi-autonomous functions. Thus, the accuracy of the data presented by the sensors is of paramount importance.

One type of calibration of sensors is the physical calibration of the devices. For the vehicle positioning system to use the output of the sensors, it must be able to account for differences between the timing of the data caused by physical location of the sensors. For example, if an IMU is mounted closer to the rear of a vehicle than a lidar sensor, it may detect a collision (e.g., through a sudden acceleration) more quickly than a lidar sensor may detect that a vehicle has become dangerously close to the vehicle. Of course, because a lidar sensor generates data so quickly, the difference may be quite small, but in certain applications this small timing difference may lead to dangerous and unchecked miscalculations. Thus, it is necessary for the vehicle manufacturer, or after-market component manufacturer, to supply an accurate physical calibration among sensors to the vehicle positioning system.

A common step of upkeep for most critical sensors is routine calibration, which may generally take the form of exposing the sensor to an external stimulus of a known type and magnitude to ensure that the device is operating within a required degree of accuracy. Calibration can detect and correct many types of errors exhibited by sensors. IMUs present a special challenge by their nature. Many IMUs are a closed system, one with limited or no input. The IMU merely outputs measurements of the forces it detects. IMUs also typically lack the ability to self-calibrate. As such, two types of errors, known as bias and scale factor, are particularly problematic for devices such as IMUs. Both bias and scale factor can affect the gyroscope and accelerometers used in IMUs.

Bias refers to the consistent detection of forces that are not actually being exerted on the IMU. For example, an IMU at rest, without errors, may detect no acceleration along the x-axis and the y-axis (e.g., no translational acceleration). On Earth, the IMU will also detect acceleration of $-9.81$ m/s$^2$ along the z-axis (e.g., the effect of gravity). The output of the IMU may be a vector comprising these acceleration figures: (0, 0, −9.81). When the IMU experiences acceleration of 1.0 m/s$^2$ along the x-axis, the output may change accordingly: (1.0, 0, −9.81). An IMU affected by bias will detect additional forces that are not actually being exerted on the IMU. For example, an IMU at rest may detect additional forces along the x-axis, so that its output inaccurately reports translational acceleration of: (2.0, 0, −9.81). When the same IMU actually experiences acceleration along the x-axis, the values still show the additional acceleration, e.g., (3.0, 0, −9.81). Thus, the IMU is said to exhibit bias of +2.0 along the x-axis.

Figure 3:
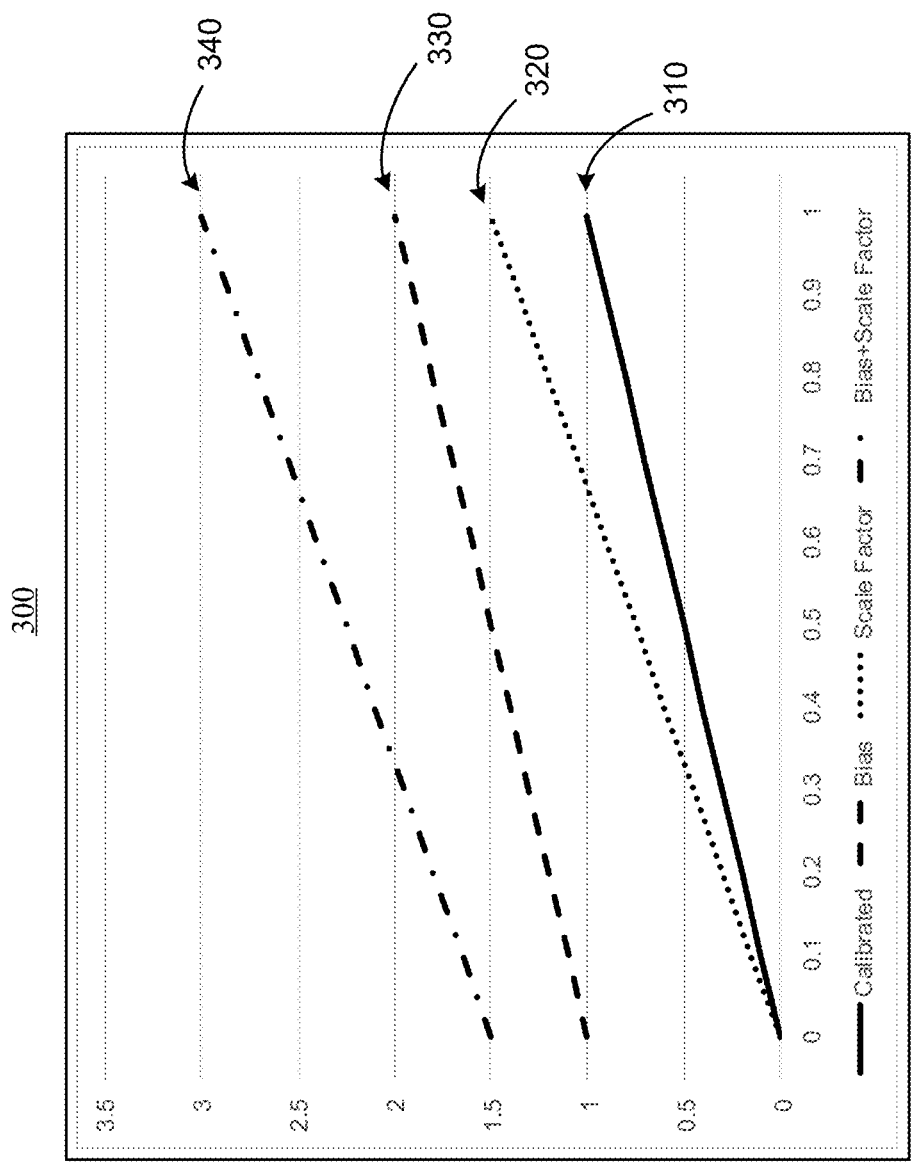
FIG. 3 illustrates an example effect of bias and scale factor errors.

The effect of bias is illustrated in FIG. 3, which includes a chart 300 comparing the output along a single axis of a properly calibrated IMU (shown as solid line 310) compared to example output from IMUs exhibiting multiple errors. The dashed line 330 shows the example output of an IMU exhibiting bias along this axis. The output 310 of the calibrated IMU spans from 0.0 to 1.0. The output 330 of the IMU under bias spans from 1.0 to 2.0. Thus, the IMU under bias is exhibiting a bias of 1.0 along this axis. This bias is shown in the chart as an offset along the y-axis of the chart of the line formed by the output of the IMU under bias as compared to the output of the properly calibrated IMU.

Scale factor refers to a value that is, in effect, scaling the measurements output by the IMU. For example, an IMU at rest, without errors, may detect no acceleration along the x-axis and the y-axis (e.g., no translational acceleration) and detect the acceleration caused by gravity, so that the output will be: (0, 0, −9.81). When the IMU experiences acceleration of 1.0 m/s$^2$ along the x-axis, the output may change accordingly: (1.0, 0, −9.81). When the IMU experiences acceleration of 2.0 m/s$^2$ along the x-axis, the output may further change accordingly: (2.0, 0, −9.81). An IMU exhibiting a scale factor error along the x-axis while at rest will output the same values: (0, 0, −9.81). When the IMU exhibiting a scale factor error of experiences acceleration of 1.0 m/s$^2$ along the x-axis, the output may change accordingly: (1.5, 0, −9.81). When the IMU experiences acceleration of 2.0 m/s$^2$ long the x-axis, the output may further change to: (3.0, 0, −9.81). Based on this, the IMU may be said to be exhibiting a scale factor error of 1.5 (e.g., the output value is 150% the actual value experienced).

The effect of scale factor is illustrated in the chart 300 of FIG. 3. The output along a single axis of a properly calibrated IMU is shown as solid line 310. The output along a single axis of an IMU exhibiting a scale factor error of 1.5 is shown as dotted line 320. The output 310 of the calibrated IMU spans from 0.0 to 1.0. The output 320 of the IMU exhibiting a scale factor error spans from 0.0 to 1.5. When viewed on a chart such as chart 300 of FIG. 3, scale factor error manifests as a line having a different slope than a line representing the output of a properly calibrated IMU. As can be seen, scale factor error is especially problematic because it cannot typically be detected while the IMU does not experience external forces (e.g., when it is at rest). Scale factor error also leads to increasingly incorrect values as the magnitude of the forces increases.

The chart 300 of FIG. 3 also includes the output of an IMU exhibiting both bias and scale factor errors, shown as dotted-dashed line 340. This can be determined from the chart 300 because the line 340 shows an offset from the output line 310 of a properly calibrated IMU and has a different slope from that line. It should be noted that both bias and scale factor can be positive or negative and may affect one or more axes of an accelerometer or gyroscope of an IMU. In some cases, the effects may be correlated, such as where the axes of the sensor are not perfectly orthogonal. Even within this simple example, it is possible to see why proper calibration of an IMU is important to accurate measurements. An IMU exhibiting a scale factor error may generate results that are vastly different from the actual exerted force. In critical systems, even a small degree of bias or scale factor may lead to dangerous cascading errors.

Given the pervasiveness of the errors, and the importance of accurate data, it is necessary for IMUs to be quickly and accurately calibrated. Calibrating an IMU requires applying a known force to the IMU, determining whether the IMU correctly outputs the appropriate values, and determining some correction for the IMU values if they are incorrect which may include diagnosing the fundamental source of the error. This basic technique is quite difficult, especially if the IMU is embedded as part of larger system, such as a sensor array used with a vehicle. Furthermore, IMU output tends to "drift" over time. Because IMUs lack the ability to self-calibrate, the starting reference point for measuring forces (e.g., what is "stationary") may shift over time—in some cases within just a few hours of calibration. Sudden movements may cause drift to occur more frequently. IMU calibration is further complicated when considering the nature of the forces that an IMU detects, including translational acceleration and rotation, which may be difficult to reliably reproduce.

Current approaches for calibrating IMUs that are included in a vehicle sensor array require that the vehicle be essentially taken out of service so that the IMU may be subjected to a battery of carefully prescribed driving scenarios. This may be costly and inconvenient to the user. If properly executed, these driving scenarios will cause the IMU to be subjected to known forces of known magnitude and will allow a vehicle positioning system to calibrate the output of the IMU. For example, the scenarios may include accelerating the vehicle at a prescribed rate (e.g., 1.0 m/s$^2$) for a prescribed amount of time (e.g., 4 seconds). The operator of the vehicle may notify the vehicle positioning system that they are beginning a calibration procedure, so that the vehicle positioning system can detect the output of the IMU. The vehicle positioning system may then determine errors in the output in the IMU's accelerometer. As another example, a vehicle operator may drive the vehicle in a highly specified pattern, such as a figure-eight shape, or following a set course. Note that in some cases the vehicle operator may operate the vehicle manually or remotely. While the vehicle is following the pattern or course, the vehicle positioning system may receive the output of the IMU and compare it to expected output values. In this way, the vehicle positioning system may be able to determine errors in the output produced by the IMU's gyroscope. One considerable challenge in calibrating IMUs included in a vehicle sensor array under current techniques is that it requires a high degree of compliance from a human actor. The system cannot be reasonably automated or simplified. Errors introduced by the human actor, such as failing to properly follow the calibration procedure, may be erroneously interpreted as errors in the output of the IMU. An additional challenge is that these procedures require dedicated time and space to perform. The vehicle must be taken out of service entirely, even for routine calibration. To counteract this, a vehicle manufacturer may use more expensive sensors that are less prone to calibration errors, but that increases the cost of the vehicles.

As explained previously, one or more lidar sensors and IMUs may be housed together in a single assembly. This simplifies manufacturing costs, by reducing extra steps of physical calibration, synchronization, and power routing. In addition to these important improvements in sensor arrays, incorporating IMUs and lidar sensors in a single assembly also allows a vehicle positioning system to calibrate the IMUs in an integrated movement measurement unit "on-line" (that is, while the vehicle is still in service, e.g., on the road). Based on how the IMUs and lidar sensors are added to the housing, it may be possible to regularly calibrate an IMU for bias and scale factor exhibited by the accelerometer and gyroscope of the IMU. The IMU may therefore be calibrated automatically, on a much more frequent basis, and at less cost to the operator. Because IMUs can be calibrated more frequently, less expensive IMUs (e.g., rated for the same sensitivity, but less resistance to calibration requirements) may be used. Additional benefits may be derived based on how the lidar sensors and IMUs are arranged within the housing. These benefits and arrangements are explained in detail with respect to FIGS. 4A-10B.

Figure 4A:
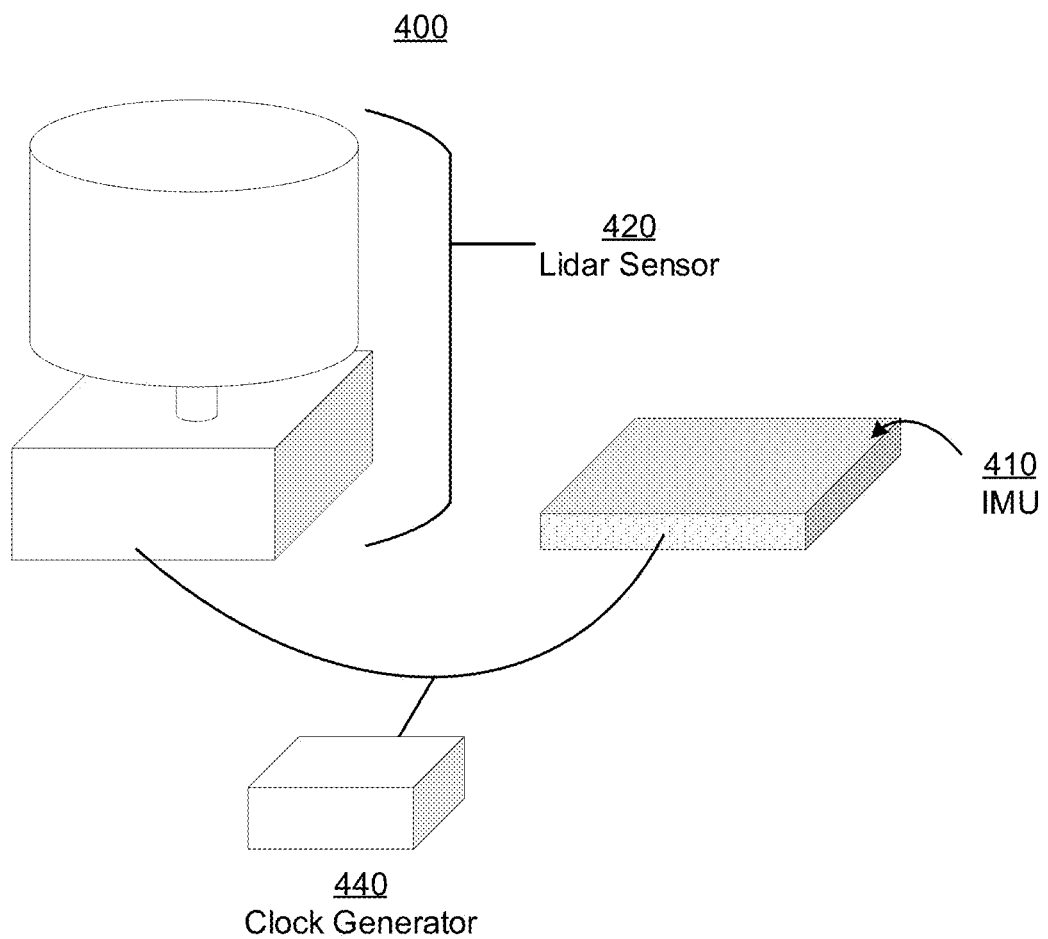
FIG. 4A illustrates components of a movement measurement system.

FIG. 4A illustrates example components in a configuration that may be used in a movement measurement unit. FIG. 4A shows an IMU 410 and a lidar sensor 420. In particular embodiments, the IMU 410 may be a conventional IMU, available from various manufacturers. Similarly, lidar sensor 420 may be a conventional lidar sensor available from various manufacturers. As shown in FIG. 4A, the IMU 410 and lidar sensor 420 are each provided a clock signal 445 from a clock generator 440. For example, the clock generator 440 may be a standalone clock generator, for use in a movement measurement or vehicle positioning system. As another example, the clock generator 440 may be a system-wide clock generator, used by a computing system of a vehicle. As described above, the clock generator 440 may synchronize the clock signal 445 between the IMU 410 and lidar sensor 420, so that the output of the sensors may be easily correlated. A configuration like that shown in FIG. 4A may also be used to provide power to the two sensors, with a single power source providing synchronized power between the IMU 410 and lidar sensor 420.

Figure 4B:
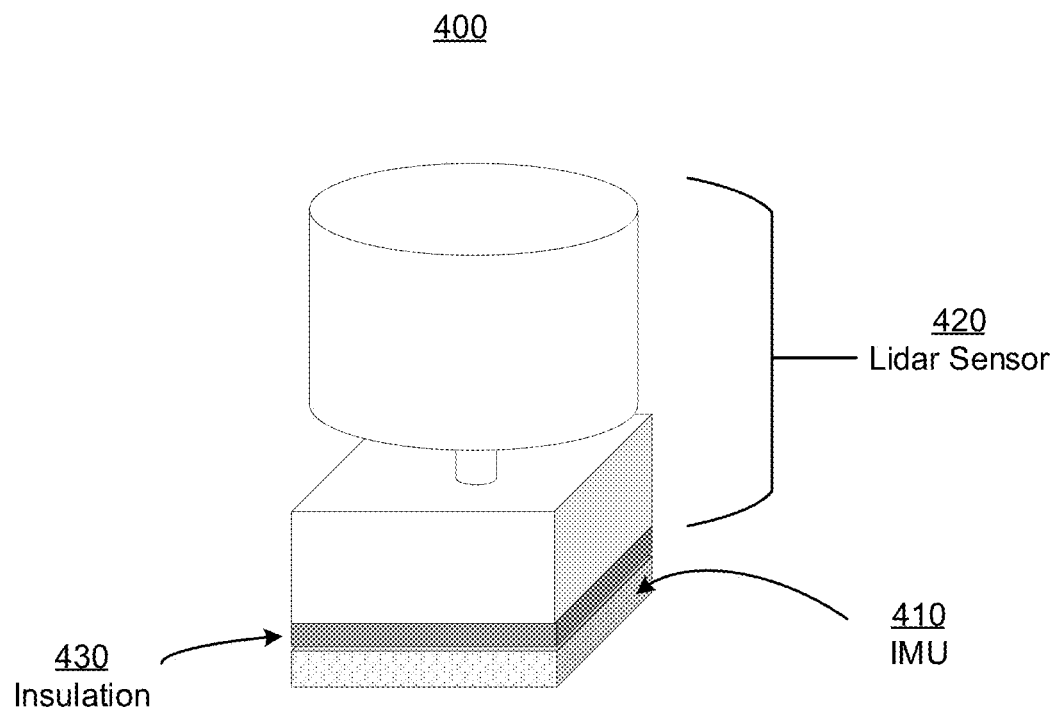
FIG. 4B illustrates an example configuration of an integrated movement measurement unit.

FIG. 4B illustrates an example of one embodiment of an integrated movement measurement unit. In this embodiment, an IMU 410 and a lidar sensor 420 are each included in an integrated movement measurement unit 400. The integrated movement measurement unit 400 may be suitable for inclusion in a sensor array of a vehicle, or as a standalone component. The integrated movement measurement unit 400 may be configured to be mounted to the roof of a vehicle or any other suitable point. Within the integrated movement measurement unit 400, the IMU 410 and the lidar sensor 420 are each affixed such that they would move with a vehicle but would not move laterally otherwise. In the illustrated configuration, the lidar sensor 420 is mounted on top of the IMU 410, with a base of the lidar contacting an insulation component 430 of the movement measurement sensor 400. The insulation component 430 isolates the inertial measurement unit from forces caused by the high-speed rotation of the lidar sensor 420. Such forces may otherwise cause errors in output of the IMU. In this way, the lidar sensor 420 is still capable of rotating as needed without disturbing the IMU 410. In particular embodiments, the IMU 420 and lidar sensor 420 may be directly connected. With the IMU 410 and lidar sensor 420 of the integrated movement measurement unit 400 coupled in this way, the benefits described above regarding power delivery and clock synchronization may be easily realized. Additionally, because the positions of the IMU 410 and lidar sensor 420 relative to each other are known, their physical calibration can be noted by a vehicle positioning system of the vehicle 430 as needed.

Figure 5:
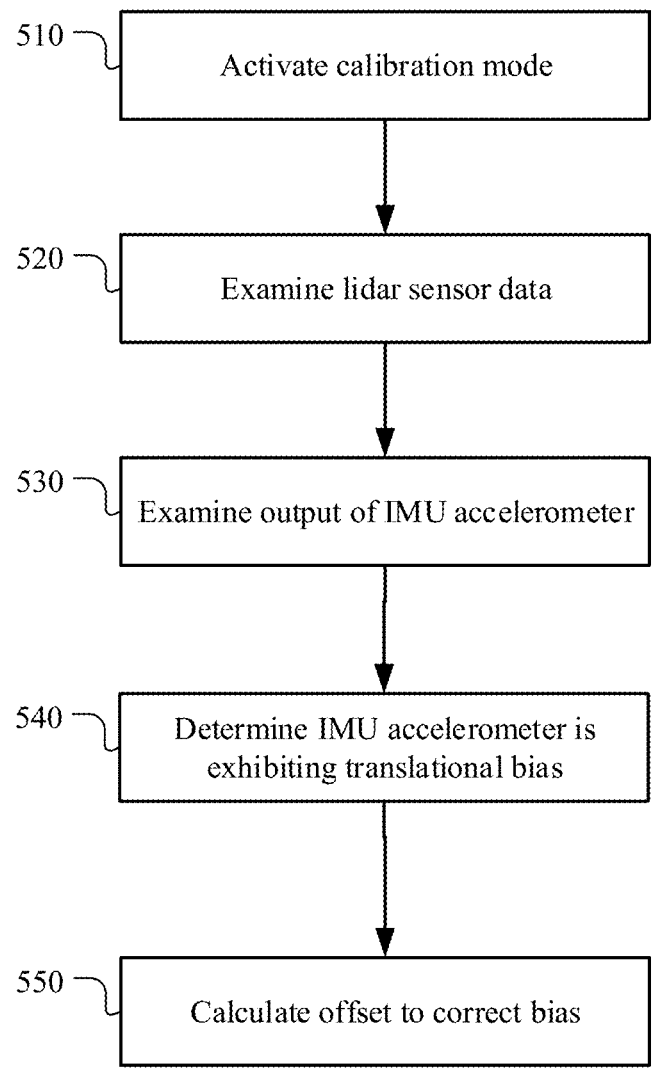
FIG. 5 illustrates an example method for calibrating components of an integrated movement measurement assembly.

An integrated movement measurement unit, such as the embodiment illustrated in FIG. 4B may allow a vehicle positioning system to use particular IMU calibration methods. For example, a three-axis accelerometer of the IMU 410 may be calibrated to account for bias errors. A method 500 by which the vehicle positioning system may calibrate the IMU 410 is illustrated in FIG. 5. At step 510, the vehicle positioning system may activate a calibration mode for the IMU 410. This may be triggered periodically based on time in service, distance driven, time since last calibration or any other suitable metric, or may be remotely activated. At step 520, the vehicle positioning system may examine the output of the lidar sensor 420. Based on the data received from the lidar sensor 420, the vehicle positioning system may determine movement data such as an acceleration of the vehicle with which the integrated movement measurement unit 400 is coupled. For example, the vehicle positioning system may determine that the vehicle is stationary. At step 530, the vehicle positioning system may examine the output of the accelerometer of the IMU 410. If the accelerometer outputs values indicating acceleration other than that caused by the force of gravity (e.g., other than 0, 0, $-9.81$ m/s$^2$), then, at step 540, the vehicle positioning system may determine that the accelerometer of the IMU 410 is exhibiting a translational bias error. At step 550, the vehicle positioning system may calculate an offset, or calibration factor, to correct the determined translational bias. The vehicle positioning system may store the offset and use the offset to calculate (or apply the offset) a calibration factor for subsequent measurements from the accelerometer of the IMU 410. For example, the offset value read while the vehicle is stationary may be denoted $b_a$, with the output of the accelerometer of the IMU 410 at a time t after calibration denoted A(t). For subsequent measurements, the calibrated measurement, accounting for bias, may be calculated as $A'(t)=A(t)-b_a$. This calibrated measurement may be substituted for future measurement uses.

Figure 6:
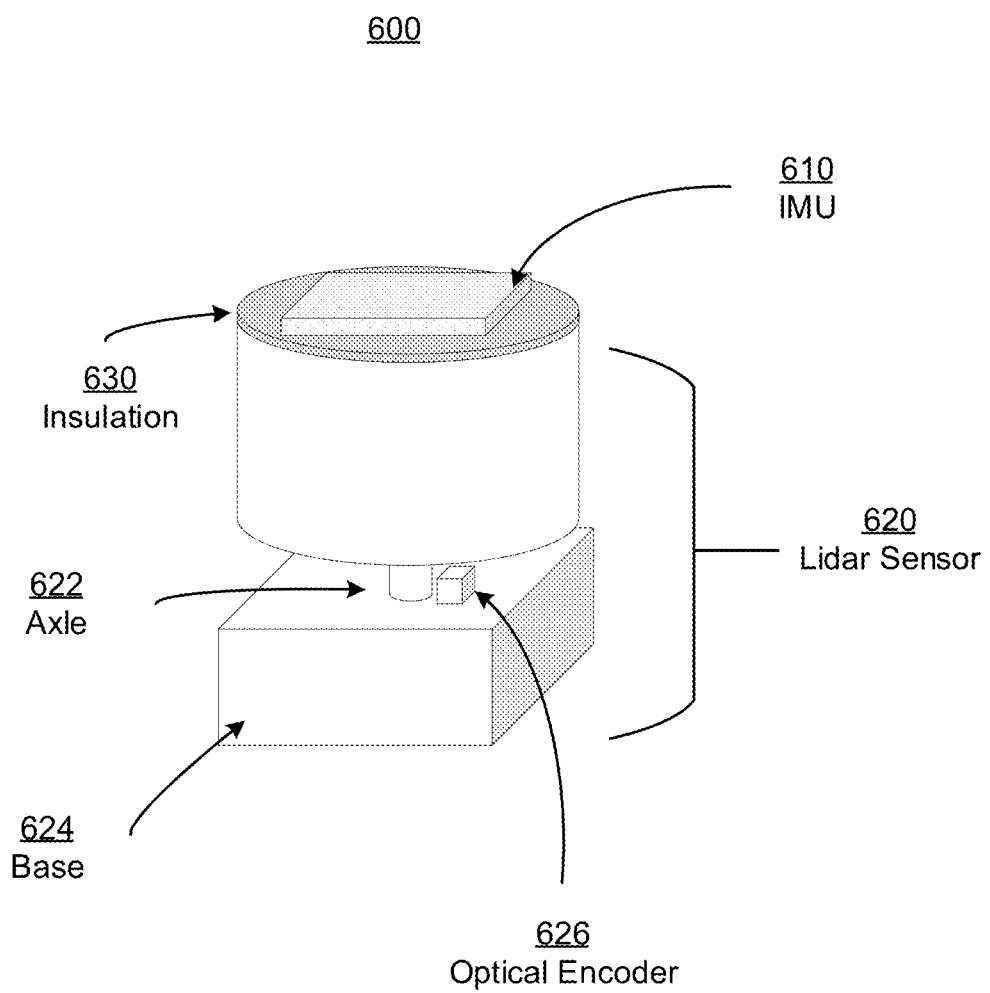
FIG. 6 illustrates an example configuration of an integrated movement measurement unit.

FIG. 6 illustrates an example of another embodiment of an integrated movement measurement unit. In this embodiment, an IMU 610 and lidar sensor 620 are each included in an integrated movement measurement unit 600. Like the integrated movement measurement unit 400 shown in FIG. 4B, the integrated movement measurement unit 600 shown in FIG. 6 may be suitable for mounting to a vehicle. In this embodiment, the IMU 610 is mounted to a rotating portion of the lidar sensor 620. Insulation component 630 may optionally be used. For example, the IMU 610 may be mounted to the top of the lidar sensor 620 so that the reflecting and detecting capabilities of the lidar sensor 620 are not impeded. In this configuration, the IMU 610 and lidar sensor 620 may rotate together about the axle 622 of the lidar sensor 620. The rotation may be powered by the rotating base 624 of the lidar sensor 620 that contains one or more motors (e.g., servomotor 230). The rotation of the lidar sensor 620 and IMU 610 may be confirmed by the optical encoder 626 of the lidar sensor 620. The integrated movement measurement unit 600 may be attached to and/or coupled with the vehicle 630 so that lateral movement of the integrated movement measurement unit 600 relative to the vehicle may be eliminated.

Figure 7:
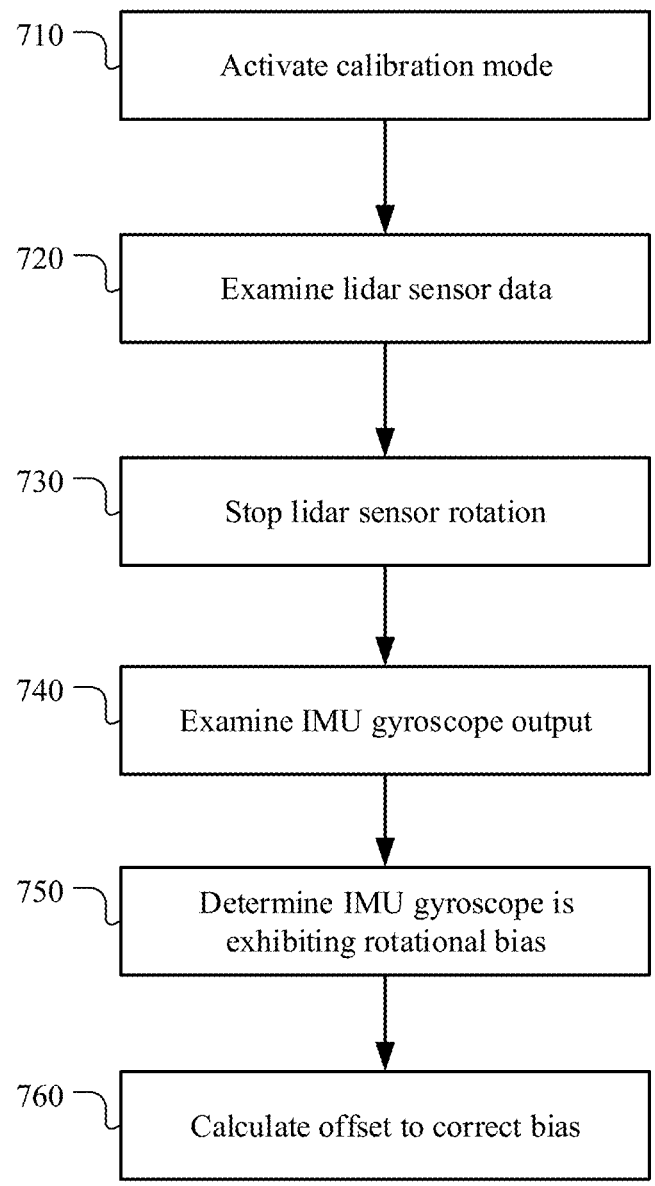
FIG. 7 illustrates an example method for calibrating components of an integrated movement measurement assembly.

An integrated movement measurement unit, such as the embodiment illustrated in FIG. 6 may allow a vehicle positioning system to use particular IMU calibration methods. For example, a three-axis gyroscope of the IMU 610 may be calibrated to account for bias and scale factor errors. A method 700 by which the vehicle positioning system may calibrate the gyroscope of the IMU 610 to correct bias is illustrated in FIG. 7. At step 710, the vehicle positioning system may activate a vehicle calibration mode for the IMU 610. This may be triggered periodically based on time in service, distance driven, time since last calibration or any other suitable metric, or may be remotely activated. At step 720, the vehicle positioning system may examine the output of the lidar sensor 620. Based on the data received from the lidar sensor 620, the vehicle positioning system may determine movement data such as an acceleration of the vehicle with which the integrated movement measurement unit 600 is coupled. For example, the vehicle positioning system may determine that the vehicle is stationary. At step 730, the rotation of the lidar sensor 620 may be stopped. At step 740, the vehicle positioning system may examine the output of the gyroscope of the IMU 610. A sufficiently precise gyroscope of an IMU 610 may detect the rotation of the Earth (e.g., approximately 15 degrees per hour). In particular embodiments, the rotation of the Earth may be precalculated and may be used by the gyroscope for the calibration. Including an offset for the rotation of the Earth, if the gyroscope outputs non-zero values, at step 750, the vehicle positioning system may determine that the gyroscope is exhibiting a rotational bias error. In particular embodiments, the rotation of the Earth may be calculated as part of the described gyroscope calibration process (e.g., no precalculated value for the rotation of the Earth may be used). At step 760, the vehicle positioning system may calculate an offset value or calibration factor to correct the determined rotational bias of the gyroscope of the IMU 610. For example, the offset value read at this time may be denoted $b_9$, with the output of the gyroscope of the IMU 610 at a time t after calibration denoted $G(t)$. The vehicle positioning system may store the offset and use the offset to calculate (or apply the offset) a calibration factor for subsequent measurements from the gyroscope of the IMU 610. For subsequent measurements, the calibrated measurement, accounting for bias may be calculated as $G'(t)=G(t)-b_g$. This calibrated measurement may be substituted for future measurement uses.

The offset value, or calibration factor, may optionally be refined by causing the lidar sensor 620 to rotate at a specified rate. Steps 740-760 may be performed with the lidar sensor rotating at a known rate. The output of the gyroscope of the IMU 610 may be compared to the value of the rotation rate of the lidar sensor 620 (e.g., based on the specified rotation rate, or the output of the optical encoder 626 of the lidar sensor 620). If the rotation rate of the lidar sensor 620 and the output of the gyroscope of the IMU 610 differ, the vehicle positioning system may determine that the IMU 610 is exhibiting a bias. The vehicle positioning system may compare the stationary bias to the rotating bias and determine whether the two biases differ. The vehicle positioning system may refine the offset or calibration factor to use by, e.g., calculating an offset for the rotating bias, calculating bias to use based on the rotating bias and stationary bias (e.g., arithmetic mean), or determining that the difference between the rotating bias and stationary bias is caused by some other error (e.g., scale factor) and choose to use the stationary bias for all measurements. To complete calibration, the vehicle positioning system may store the offset and use the offset as a calibration factor for subsequent measurements from the gyroscope of the IMU 610.

A scale factor exhibited by the gyroscope of the IMU 610 may also be determined. Because the lidar sensor 620 is expected to rotate at a specified rate, and further because this rate may be confirmed by reference to the optical encoder 626, it may be possible to compare the expected rotation rate with the rotational rate measured by the IMU 610. A difference between the expected rotational rate and the output rotational rate may come from several sources, including, gyroscopic bias, gyroscopic scale factor error, errors with the power delivery of a servomotor of the lidar 620, errors with a self-reported rotational rate of the servomotor of the lidar 620, or other related sources. In this embodiment, the vehicle positioning system may take advantage of components of the integrated moment measurement unit 600 to isolate and calibrate the error. For example, the lidar sensor 620 may comprise an optical encoder 626 to determine whether the lidar sensor 620 is rotating at the specified rate. The lidar sensor 620 may compare the rotational rate value determined by the optical encoder 626 to a value reported by the servomotor (if supported) and/or to the specified value. This may serve as a check to ensure that the lidar sensor 620 is functioning properly. Any differences between the specified rate and the reported rate (e.g., reported by the optical encoder 626) can be accounted for in the IMU gyroscope calibration.

Figure 8:
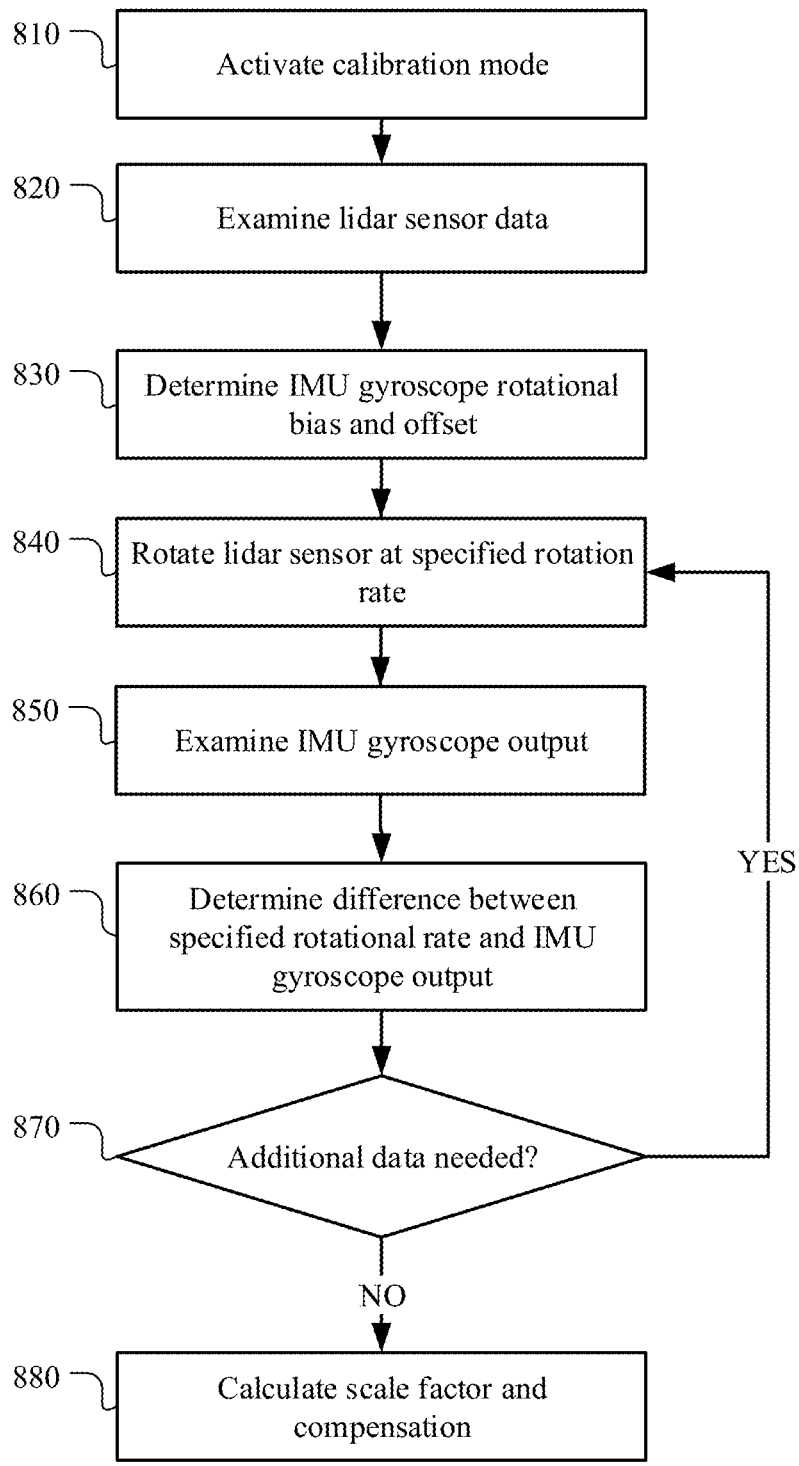
FIG. 8 illustrates an example method for calibrating components of an integrated movement measurement assembly.

A method 800 by which the vehicle positioning system may calibrate the gyroscope of the IMU 610 to correct scale factor error is illustrated in FIG. 8. At step 810, the vehicle positioning system may activate a calibration mode for the IMU 610. This may be triggered periodically based on time in service, distance driven, time since last calibration or any other suitable metric, or may be remotely activated. At step 820, the vehicle positioning system may examine the output of the lidar sensor 620. Based on the data received from the lidar sensor 620, the vehicle positioning system may determine movement data such as an acceleration of the vehicle to which the integrated movement measurement unit 600 is attached and/or coupled. For example, the vehicle positioning system may determine that the vehicle is stationary. At step 830, the vehicle positioning system may determine a rotational bias (and offset or calibration factor to correct said rotational bias), for the gyroscope of the IMU 610 (e.g., according to the method 700). To determine a scale factor for the gyroscope of the IMU 610, the bias offset must first be determined as described above. This value can be further confirmed by reference to an optical encoder included as part of the lidar sensor 620. With the bias offset or calibration factor known, at step 840 the vehicle positioning system may instruct the lidar sensor 620 to briefly rotate at specified rotational rate. At step 850, the vehicle positioning system may examine the output of gyroscope 626 of the IMU 610. At step 860, the vehicle positioning system may determine a difference between the offset-adjusted output of the IMU 610 and the expected rotational rate (as determined by the specified value or the optical encoder of the lidar system 620). It may be expected that the difference is caused by the scale factor error. This difference may be used as a data point to correct the scale factor error.

At step 870, the vehicle positioning system may determine whether additional data points must be collected. This may be done by comparing the number of collected data points to a threshold number of data points. The vehicle positioning system may also use a more sophisticated technique to determine whether additional data points are needed (e.g., by using the collected data points to predict the value at an additional data point, if the prediction is accurate, the vehicle positioning system may determine that no additional data points are required). If additional data points are needed, the vehicle positioning system may return to step 840, using a different speed. If no additional data points are needed, at step 880, the collected data points may be analyzed to determine the value of the scale factor error, and determine a scalar compensation, s, to correct the output. The vehicle positioning system may store the scalar compensation and apply it as a calibration factor for subsequent measurements from the IMU 610. For example, taking into account the bias offset $b_g$ and scalar compensation $s_g$, the calibrated measurement of the gyroscopic output G at time t after calibration, may be calculated as $$G'(t) = \frac{G(t) - b_g}{s_g}.$$

This calibrated measurement may be substituted for future measurement uses.

Scale factor is often considered to be a scalar value. However, using the method described above, the integrated movement measurement unit 600 may be capable of determining a non-scalar calibration value. For example, the vehicle positioning system may cause the lidar sensor 620 to rotate at a variety of speeds. Simultaneously, the vehicle positioning system may determine the output of the gyroscope of the IMU 610 at these differing speeds. Using the collected values, the vehicle positioning system may determine that the relationship between the values satisfies a threshold for using the non-scalar calibration value.

Figure 9:
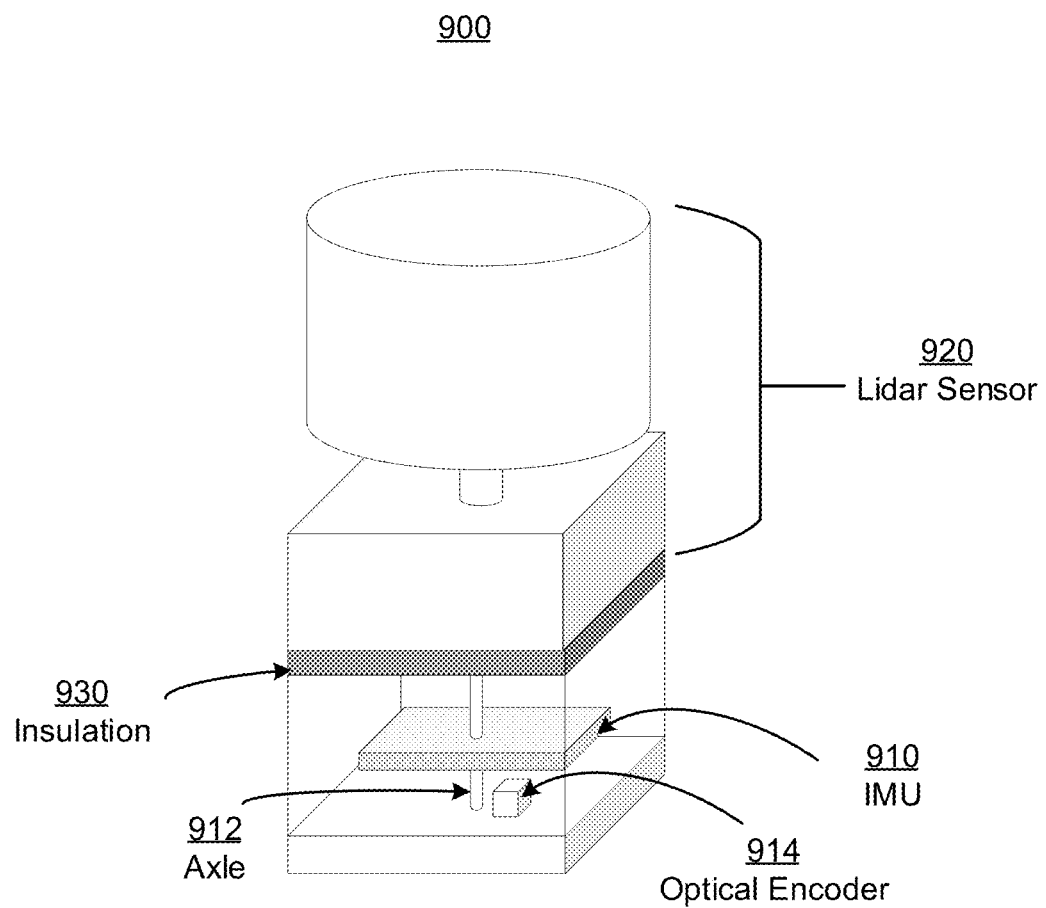
FIG. 9 illustrates an example configuration of an integrated movement measurement unit.

FIG. 9 illustrates an example of another embodiment of an integrated movement measurement unit. In this embodiment, an IMU 910 and lidar sensor 920 are each included in an integrated movement measurement unit 900. The IMU 910 is mounted such that it is suspended with one or more degrees of freedom—it is able to rotate along one or more axes. This causes the magnitudes of the rotations experienced by the IMU 910 to be reduced. In the illustrated example, the IMU 910 is mounted with an axle 912 through the center of the IMU 910 such that it is fixed along the x-axis and y-axis (e.g., it may not move laterally), but is not fixed along the z-axis (e.g., it is able to rotate around an axis running through the center of the IMU 920). The integrated movement measurement unit 900 also includes an optical encoder 914 that may be used to measure rotations experienced by the integrated movement measurement unit 900 (and vehicle) by measuring larger-scale rotations of the IMU 910 about its free axes. Thus, the optical encoder 914 measures the greater magnitude rotations that may otherwise be missed by the suspended IMU 910. Above the integrated movement measurement unit 900 compartment housing the rotating IMU 910, the integrated movement measurement unit also includes a lidar sensor 920. Separating the lidar sensor 920 and IMU 910 is an insulation component 930 to further isolate the IMU 910 from the lidar sensor 920.

The suspended nature of the IMU 910, provides a solution to a pervasive problem with IMUs generally. IMUs can be manufactured to have a specified level of sensitivity, but typically that range of sensitivity is limited. That is, if an IMU may accurately determine minute changes in translational acceleration or rotational rate, it may not be capable of determining larger changes. Similarly, an IMU designed to determine large scale translational acceleration or rotational rate changes may not be capable of determining more minute differences. Relatively sensitive IMUs suffer from the additional drawback that sudden, rapid changes in acceleration or rotational rate may introduce large errors in the output of the IMU. This may require additional calibration to correct. For example, an IMU may be configured to detect normal rotational rate changes experienced by a vehicle while driving. While driving, the vehicle may be required to swerve or brake suddenly to avoid striking an object that appears in the street (e.g., a child's ball that has rolled into the street). This action may cause the IMU to become uncalibrated and may render the output of the IMU unreliable or even dangerous to use. This may be particularly troublesome in an autonomous vehicle, as the vehicle may default to a non-moving state out of concern for the safety of passengers, pedestrians, and other vehicles.

The IMU 910 illustrated in FIG. 9 provides a solution to reduce the impact of sudden movements on IMU calibration and also allows an integrated movement measurement unit 900 to detect both larger-scale and minute movements using only a single IMU 910. The degrees of freedom allotted to the rotation of the suspended IMU 910 prevent the IMU 910 from experiencing sudden acceleration or rotation along its free axes. The optical encoder 914 configured to detect the movement of the axle 912 measures the rotation of the IMU 910 around this axle 912*m*, which in-turn measures the large-scale rotations of the vehicle. Meanwhile, the IMU 910 may report only small variations in the movement, if at all. Therefore, to determine the true rotation (or acceleration) experienced by the integrated movement measurement unit 900, the output of both the IMU 910 and the optical encoder 914 must be used. In this configuration, however, the IMU's calibration is preserved for longer periods of time. The IMU 910 must still be used however, as the optical encoder 914 may exhibit the same scaling issues affecting IMUs. Furthermore, in cases where a vehicle becomes disabled if an IMU is uncalibrated, this embodiment may prevent such an occurrence after a near-collision or evasive maneuver.

Many of the same calibration techniques described above may be used with the embodiment illustrated in FIG. 9. For example, the calibration method 400 to determine a bias of the accelerometer of an IMU 910, described with respect to the embodiment illustrated in FIG. 4B, may be modified to be used with the embodiment illustrated in FIG. 9. After determining that a vehicle to which the integrated movement measurement unit 900 is mounted is at rest, the vehicle position system may analyze output from the optical encoder 914 and IMU 910. In particular embodiments, the optical encoder 914 may be a less sensitive rotation sensing device. It may therefore be less likely to exhibit bias. Therefore, the vehicle position system may use the output of the optical encoder 914 to confirm that the vehicle is at rest before determining a bias for the IMU 910. In particular embodiments, the vehicle position system may confirm that the vehicle is at rest by other means and may determine that the optical encoder 914 still provides output indicating some motion. From this, the vehicle position system may determine that the optical encoder 914 is exhibiting bias, and a similar calibration procedure may be used to correct this bias.

Figure 10A:
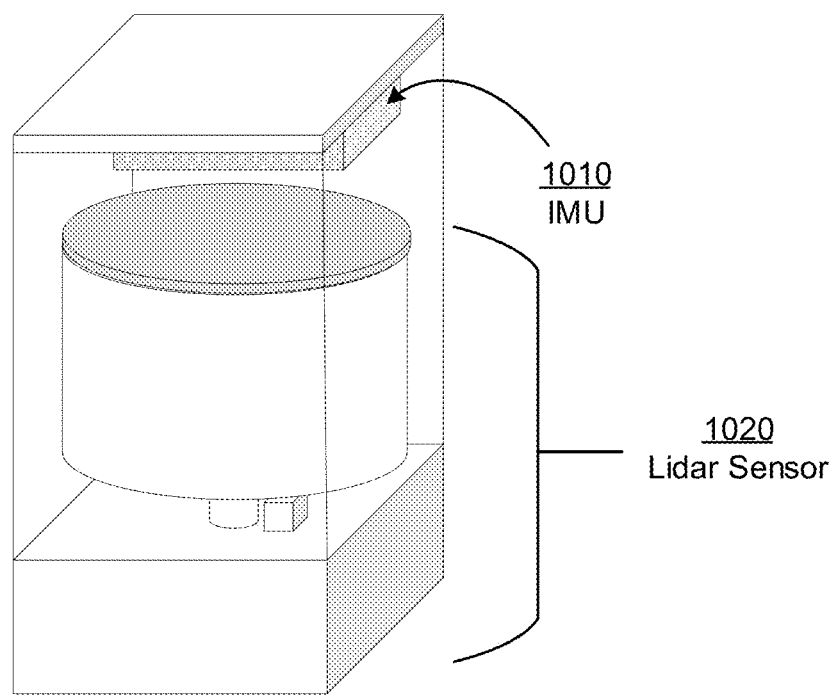
FIGS. 10A-10B illustrate an example configuration of an integrated movement measurement unit.
Figure 10B:
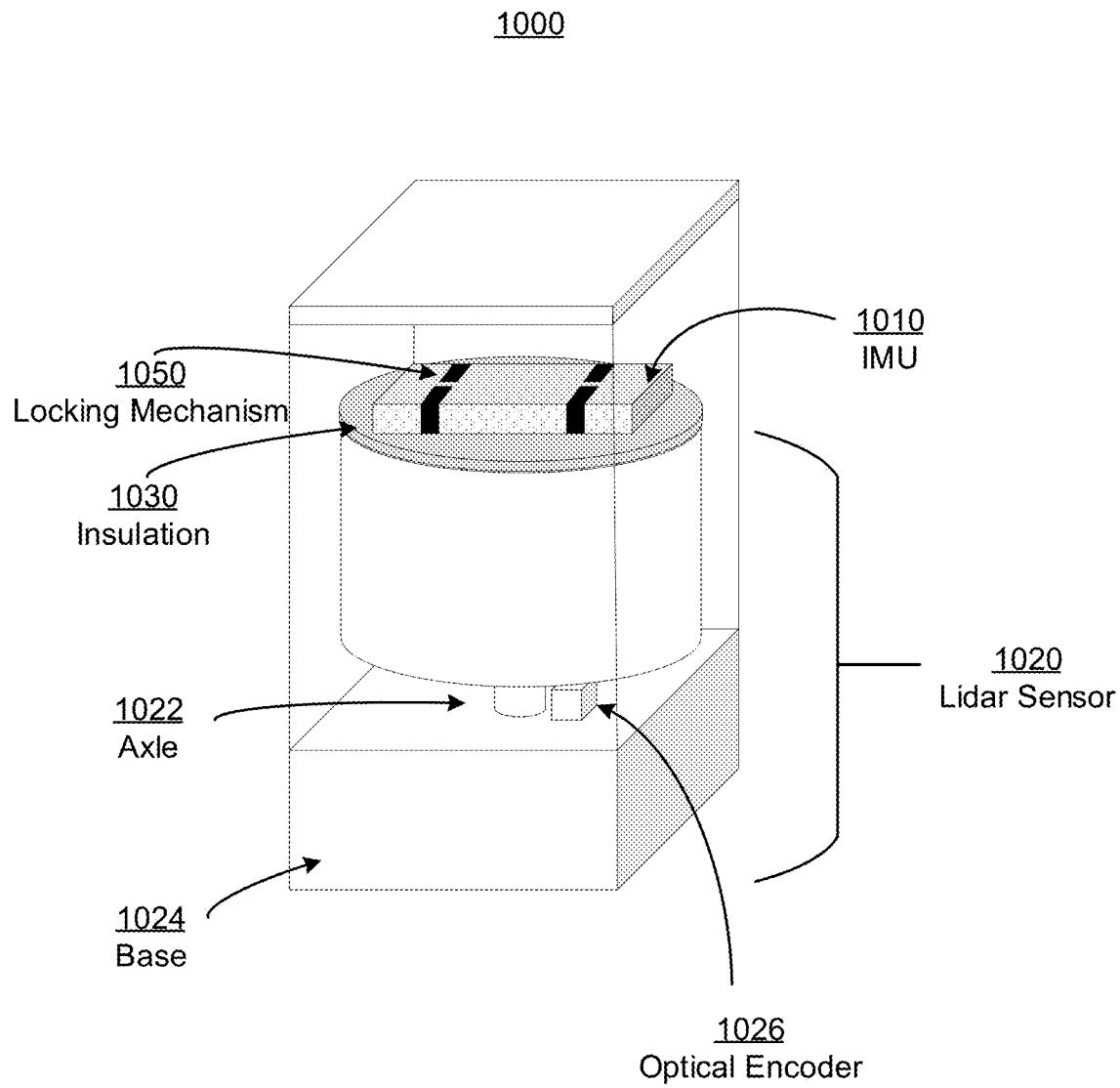

Another embodiment of an integrated movement measurement unit 1000 is illustrated in FIG. 10A and FIG. 10B. The integrated movement measurement unit 1000 features an IMU 1010 that is mounted such that it may be moved from a first position to a second position based on, for example, whether the integrated movement management unit 1000 is in an operation mode or a calibration mode. As illustrated in FIG. 10A, the integrated movement management unit 1000 includes the IMU 1010 and a lidar sensor 1020. For illustration purposes, the IMU 1010 is attached to a top portion of the integrated movement measurement unit 1000, but the IMU 1010 may be attached to any suitably stable portion of the integrated movement management unit 1000. For example, the IMU 1010 may be mounted to a side, or to a platform within the integrated movement measurement unit. The integrated movement management unit 1000 may be in an operational mode, meaning the IMU 1010 and lidar sensor 1020 are being used for their operational purposes. Because the IMU 1010 is attached to a secure and non-moving portion, its measurements reflect the movement of the object to which the integrated movement measurement unit 1000 is attached (e.g., a vehicle).

A calibration mode for the integrated movement measurement unit 1000 may be activated by the vehicle position system or another suitable system. For example, the vehicle may be in communication with a fleet management system that may remotely activate a calibration mode. Before activating the calibration mode, the integrated movement measurement unit may be configured to ensure that it is safe for it to do so. Safe in this context refers to avoiding damage both to other vehicles, pedestrians, and structure, but also to avoiding damage to the integrated movement measurement assembly 1000 itself. The vehicle position system may use data received from the lidar sensor 1020, the IMU 1010, or other sensors of the vehicle to determine that it is safe to enter the calibration mode. For example, data from the lidar sensor 1020 may indicate that the vehicle is not moving, and/or is in an area with no pedestrians or other vehicles. Data from the IMU 1020 may also be used to confirm that the vehicle is not moving.

To enter the calibration mode, the rotation of the lidar sensor 1020 is stopped, and the IMU 1020 is lowered down and attached to the top of the lidar sensor 1020. FIG. 10B illustrates a configuration of the integrated movement measurement unit 1000 while in the calibration mode. The IMU 1020 is attached to the top of the lidar sensor 1020 with an insulation component 1030 in between to isolate the IMU 1020. The insulation component 1030 also includes physical structures to secure the IMU 1010 in position during the calibration procedure. These structures may be locking mechanisms 1050 that extend over the top of the IMU 1010 as shown or may secure a bottom portion of the IMU 1010 to the insulation component. With the IMU 1010 secured, the calibration procedure may begin, and may proceed substantially as described above with respect to the embodiment illustrated in FIG. 6. The IMU 1010 and lidar sensor 1020 rotate together about the axle 1022. The base 1024 includes one or more servo motors to power this rotation at a specified rate. This rate may be verified by an optical encoder 1026. Data indicating a difference between the rate of rotation and a rate of rotation measured by the IMU 1010 may be used to calculate a bias and/or scale factor for the gyroscope of the IMU 1010. Once this is completed, the rotation of the lidar sensor 1020 is again stopped. The IMU 1010 is detached from the lidar sensor 1020. The IMU 1010 is raised back to its operational mode position and is attached to the top of the integrated movement measurement unit 1000 (e.g., as illustrated in FIG. 10A). In this position, while the vehicle is stationary, a bias for the accelerometer of the IMU 1010 may optionally be calculated. Operational rotation of the lidar sensor 1020 begins again and normal operation of the vehicle and the integrated movement measurement unit 1000 resumes. During operation, the bias and scale factor values determined during calibration may be used to correct the output of the IMU 1010.

Particular embodiments may repeat one or more steps of the methods of FIGS. 5, 7, and 8, where appropriate. Although this disclosure describes and illustrates particular steps of the methods of FIGS. 5, 7, and 8 as occurring in a particular order, this disclosure contemplates any suitable steps of the method of FIGS. 5, 7, and 8 occurring in any suitable order. Moreover, although this disclosure describes and illustrates an example method for calibrating components of an integrated movement measurement unit including the particular steps of the method of FIGS. 5, 7, and 8, this disclosure contemplates any suitable method for calibrating components of an integrated movement measurement unit, including any suitable steps, which may include all, some, or none of the steps of the method of FIGS. 5, 7, and 8, where appropriate. Furthermore, although this disclosure describes and illustrates particular components, devices, or systems carrying out particular steps of the method of FIGS. 5, 7, and 8, this disclosure contemplates any suitable combination of any suitable components, devices, or systems carrying out any suitable steps of the method of FIGS. 5, 7, and 8.

Figure 11:
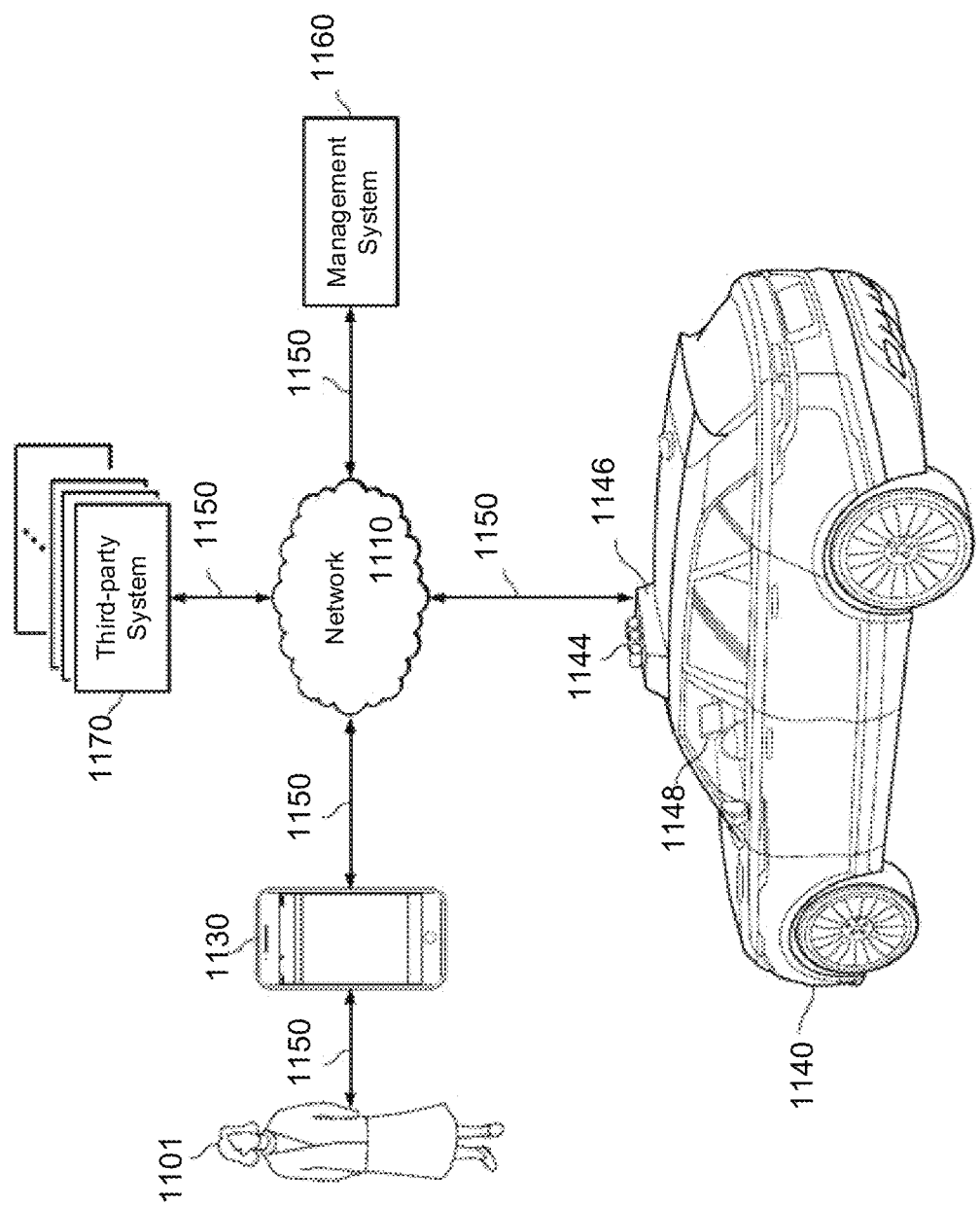
FIG. 11 illustrates an example block diagram of a transportation management environment for matching ride requestors with autonomous vehicles.

FIG. 11 illustrates an example block diagram of a transportation management environment for matching ride requestors with autonomous vehicles. In particular embodiments, the environment may include various computing entities, such as a user computing device 1130 of a user 1101 (e.g., a ride provider or requestor), a transportation management system 1160, an autonomous vehicle 1140, and one or more third-party system 1170. The computing entities may be communicatively connected over any suitable network 1110. As an example and not by way of limitation, one or more portions of network 1110 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 11 illustrates a single user device 1130, a single transportation management system 1160, a single vehicle 1140, a plurality of third-party systems 1170, and a single network 1110, this disclosure contemplates any suitable number of each of these entities. As an example and not by way of limitation, the network environment may include multiple users 1101, user devices 1130, transportation management systems 1160, autonomous-vehicles 1140, third-party systems 1170, and networks 1110.

The user device 1130, transportation management system 1160, autonomous vehicle 1140, and third-party system 1170 may be communicatively connected or co-located with each other in whole or in part. These computing entities may communicate via different transmission technologies and network types. For example, the user device 1130 and the vehicle 1140 may communicate with each other via a cable or short-range wireless communication (e.g., Bluetooth, NFC, WI-FI, etc.), and together they may be connected to the Internet via a cellular network that is accessible to either one of the devices (e.g., the user device 1130 may be a smartphone with LTE connection). The transportation management system 1160 and third-party system 1170, on the other hand, may be connected to the Internet via their respective LAN/WLAN networks and Internet Service Providers (ISP). FIG. 11 illustrates transmission links 1150 that connect user device 1130, autonomous vehicle 1140, transportation management system 1160, and third-party system 1170 to communication network 1110. This disclosure contemplates any suitable transmission links 1150, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 1150 may connect to one or more networks 1110, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1150. For example, the user device 1130 may communicate with the transportation management system via a cellular network and the Internet, but communicate with the autonomous vehicle 1140 via Bluetooth or a physical wire connection.

In particular embodiments, the transportation management system 1160 may fulfill ride requests for one or more users 1101 by dispatching suitable vehicles. The transportation management system 1160 may receive any number of ride requests from any number of ride requestors 1101. In particular embodiments, a ride request from a ride requestor 1101 may include an identifier that identifies the ride requestor in the system 1160. The transportation management system 1160 may use the identifier to access and store the ride requestor's 1101 information, in accordance with the requestor's 1101 privacy settings. The ride requestor's 1101 information may be stored in one or more data stores (e.g., a relational database system) associated with and accessible to the transportation management system 1160. In particular embodiments, ride requestor information may include profile information about a particular ride requestor 1101. In particular embodiments, the ride requestor 1101 may be associated with one or more categories or types, through which the ride requestor 1101 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1160 may classify a user 1101 based on known information about the user 1101 (e.g., using machine-learning classifiers), and use the classification to retrieve relevant aggregate information associated with that class. For example, the system 1160 may classify a user 1101 as a young adult and retrieve relevant aggregate information associated with young adults, such as the type of music generally preferred by young adults.

Transportation management system 1160 may also store and access ride information. Ride information may include locations related to the ride, traffic data, route options, optimal pick-up or drop-off locations for the ride, or any other suitable information associated with a ride. As an example and not by way of limitation, when the transportation management system 1160 receives a request to travel from San Francisco International Airport (SFO) to Palo Alto, Calif., the system 1160 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1160. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1160. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1160 in particular embodiments may predict and provide ride suggestions in response to a ride request. In particular embodiments, the system 1160 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1160 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1160 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1130 (which may belong to a ride requestor or provider), a transportation management system 1160, vehicle system 1140, or a third-party system 1170 to process, transform, manage, retrieve, modify, add, or delete the information stored in the data store.

In particular embodiments, transportation management system 1160 may include an authorization server (or any other suitable component(s)) that allows users 1101 to opt-in to or opt-out of having their information and actions logged, recorded, or sensed by transportation management system 1160 or shared with other systems (e.g., third-party systems 1170). In particular embodiments, a user 1101 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1101 of transportation management system 1160 through blocking, data hashing, anonymization, or other suitable techniques as appropriate.

In particular embodiments, third-party system 1170 may be a network-addressable computing system that may provide HD maps or host GPS maps, customer reviews, music or content, weather information, or any other suitable type of information. Third-party system 1170 may generate, store, receive, and send relevant data, such as, for example, map data, customer review data from a customer review website, weather data, or any other suitable type of data. Third-party system 1170 may be accessed by the other computing entities of the network environment either directly or via network 1110. For example, user device 1130 may access the third-party system 1170 via network 1110, or via transportation management system 1160. In the latter case, if credentials are required to access the third-party system 1170, the user 1101 may provide such information to the transportation management system 1160, which may serve as a proxy for accessing content from the third-party system 1170.

In particular embodiments, user device 1130 may be a mobile computing device such as a smartphone, tablet computer, or laptop computer. User device 1130 may include one or more processors (e.g., CPU and/or GPU), memory, and storage. An operating system and applications may be installed on the user device 1130, such as, e.g., a transportation application associated with the transportation management system 1160, applications associated with third-party systems 1170, and applications associated with the operating system. User device 1130 may include functionality for determining its location, direction, or orientation, based on integrated sensors such as GPS, compass, gyroscope, or accelerometer. User device 1130 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1130 may also include one or more cameras, scanners, touchscreens, microphones, speakers, and any other suitable input-output devices.

In particular embodiments, the vehicle 1140 may be an autonomous vehicle and equipped with an array of sensors 1144, a navigation system 1146, and a ride-service computing device 1148. In particular embodiments, a fleet of autonomous vehicles 1140 may be managed by the transportation management system 1160. The fleet of autonomous vehicles 1140, in whole or in part, may be owned by the entity associated with the transportation management system 1160, or they may be owned by a third-party entity relative to the transportation management system 1160. In either case, the transportation management system 1160 may control the operations of the autonomous vehicles 1140, including, e.g., dispatching select vehicles 1140 to fulfill ride requests, instructing the vehicles 1140 to perform select operations (e.g., head to a service center or charging/fueling station, pull over, stop immediately, self-diagnose, lock/unlock compartments, change music station, change temperature, and any other suitable operations), and instructing the vehicles 1140 to enter select operation modes (e.g., operate normally, drive at a reduced speed, drive under the command of human operators, and any other suitable operational modes).

In particular embodiments, the autonomous vehicles 1140 may receive data from and transmit data to the transportation management system 1160 and the third-party system 1170. Example of received data may include, e.g., instructions, new software or software updates, maps, 3D models, trained or untrained machine-learning models, location information (e.g., location of the ride requestor, the autonomous vehicle 1140 itself, other autonomous vehicles 1140, and target destinations such as service centers), navigation information, traffic information, weather information, entertainment content (e.g., music, video, and news) ride requestor information, ride information, and any other suitable information. Examples of data transmitted from the autonomous vehicle 1140 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1140, passengers may send/receive data to the transportation management system 1160 and/or third-party system 1170), and any other suitable data.

In particular embodiments, autonomous vehicles 1140 may also communicate with each other as well as other traditional human-driven vehicles, including those managed and not managed by the transportation management system 1160. For example, one vehicle 1140 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1160 or third-party system 1170).

In particular embodiments, an autonomous vehicle 1140 may obtain and process sensor/telemetry data. Such data may be captured by any suitable sensors. For example, the vehicle 1140 may have a Light Detection and Ranging (lidar) sensor array of multiple lidar transceivers that are configured to rotate 360°, emitting pulsed laser light and measuring the reflected light from objects surrounding vehicle 1140. In particular embodiments, lidar transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A lidar sensor is an effective sensor for measuring distances to targets, and as such may be used to generate a three-dimensional (3D) model of the external environment of the autonomous vehicle 1140. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1140 may have optical cameras pointing in different directions. The cameras may be used for, e.g., recognizing roads, lane markings, street signs, traffic lights, police, other vehicles, and any other visible objects of interest. To enable the vehicle 1140 to "see" at night, infrared cameras may be installed. In particular embodiments, the vehicle may be equipped with stereo vision for, e.g., spotting hazards such as pedestrians or tree branches on the road. As another example, the vehicle 1140 may have radars for, e.g., detecting other vehicles and/or hazards afar. Furthermore, the vehicle 1140 may have ultrasound equipment for, e.g., parking and obstacle detection. In addition to sensors enabling the vehicle 1140 to detect, measure, and understand the external world around it, the vehicle 1140 may further be equipped with sensors for detecting and self-diagnosing the vehicle's own state and condition. For example, the vehicle 1140 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1140 may build a 3D model of its surrounding based on data from its lidar, radar, sonar, and cameras, along with a pre-generated map obtained from the transportation management system 1160 or the third-party system 1170. Although sensors 1144 appear in a particular location on autonomous vehicle 1140 in FIG. 11, sensors 1144 may be located in any suitable location in or on autonomous vehicle 1140. Example locations for sensors include the front and rear bumpers, the doors, the front windshield, on the side panel, or any other suitable location.

In particular embodiments, the autonomous vehicle 1140 may be equipped with a processing unit (e.g., one or more CPUs and GPUs), memory, and storage. The autonomous vehicle may comprise a vehicle positioning system to coordinate the output of sensors and perform sensor calibration as needed. The vehicle 1140 may thus be equipped to perform a variety of computational and processing tasks, including processing the sensor data, extracting useful information, and operating accordingly. For example, based on images captured by its cameras and a machine-vision model, the vehicle 1140 may identify particular types of objects captured by the images, such as pedestrians, other vehicles, lanes, curbs, and any other objects of interest.

In particular embodiments, the autonomous vehicle 1140 may have a navigation system 1146 responsible for safely navigating the autonomous vehicle 1140. In particular embodiments, the navigation system 1146 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1146 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1146 may use its determinations to control the vehicle 1140 to operate in prescribed manners and to guide the autonomous vehicle 1140 to its destinations without colliding into other objects. Although the physical embodiment of the navigation system 1146 (e.g., the processing unit) appears in a particular location on autonomous vehicle 1140 in FIG. 11, navigation system 1146 may be located in any suitable location in or on autonomous vehicle 1140. Example locations for navigation system 1146 include inside the cabin or passenger compartment of autonomous vehicle 1140, near the engine/battery, near the front seats, rear seats, or in any other suitable location.

In particular embodiments, the autonomous vehicle 1140 may be equipped with a ride-service computing device 1148, which may be a tablet or any other suitable device installed by transportation management system 1160 to allow the user to interact with the autonomous vehicle 1140, transportation management system 1160, other users 1101, or third-party systems 1170. In particular embodiments, installation of ride-service computing device 1148 may be accomplished by placing the ride-service computing device 1148 inside autonomous vehicle 1140, and configuring it to communicate with the vehicle 1140 via a wire or wireless connection (e.g., via Bluetooth). Although FIG. 11 illustrates a single ride-service computing device 1148 at a particular location in autonomous vehicle 1140, autonomous vehicle 1140 may include several ride-service computing devices 1148 in several different locations within the vehicle. As an example and not by way of limitation, autonomous vehicle 1140 may include four ride-service computing devices 1148 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1148 may be detachable from any component of autonomous vehicle 1140. This may allow users to handle ride-service computing device 1148 in a manner consistent with other tablet computing devices. As an example and not by way of limitation, a user may move ride-service computing device 1148 to any location in the cabin or passenger compartment of autonomous vehicle 1140, may hold ride-service computing device 1148, or handle ride-service computing device 1148 in any other suitable manner. Although this disclosure describes providing a particular computing device in a particular manner, this disclosure contemplates providing any suitable computing device in any suitable manner.

Figure 12:
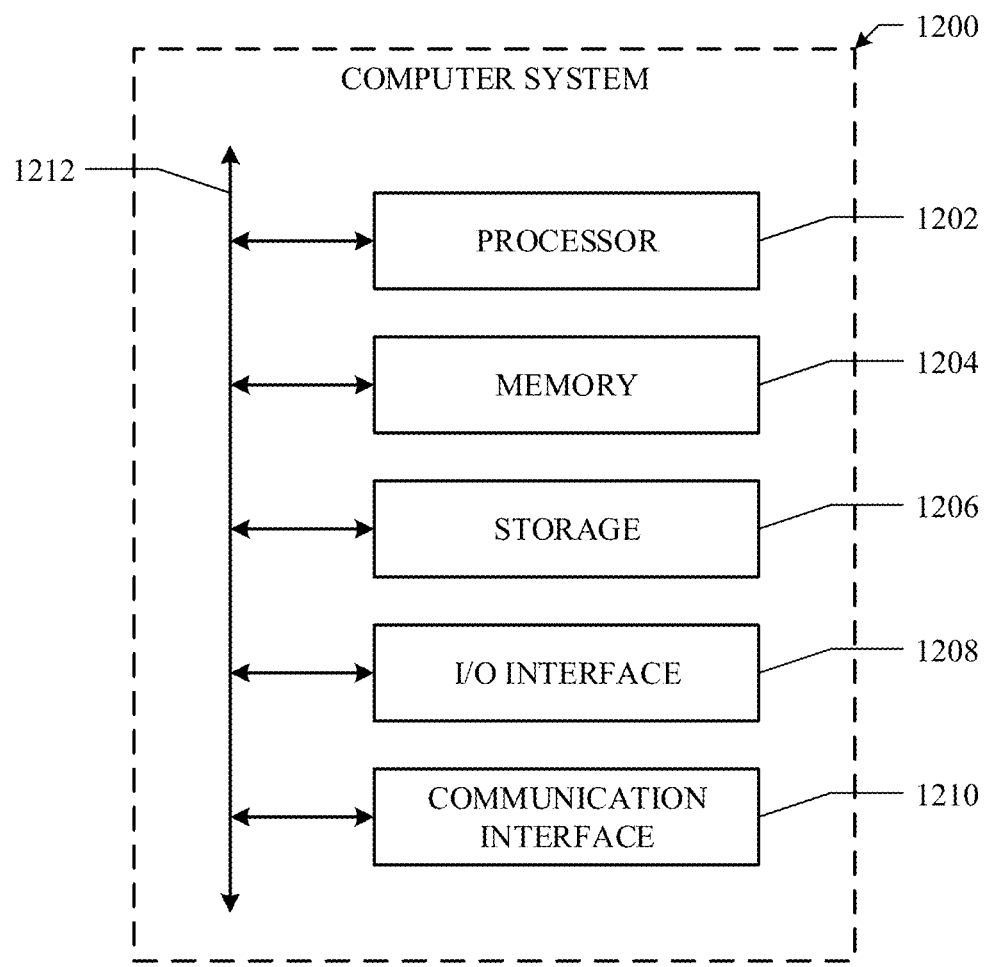
FIG. 12 illustrates an example of a computing system.

FIG. 12 illustrates an example computer system 1200. In particular embodiments, one or more computer systems 1200 perform one or more steps of one or more methods described or illustrated herein. In particular embodiments, one or more computer systems 1200 provide the functionalities described or illustrated herein. In particular embodiments, software running on one or more computer systems 1200 performs one or more steps of one or more methods described or illustrated herein or provides the functionalities described or illustrated herein. Particular embodiments include one or more portions of one or more computer systems 1200. Herein, a reference to a computer system may encompass a computing device, and vice versa, where appropriate. Moreover, a reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 that are to be operated on by computer instructions; the results of previous instructions executed by processor 1202 that are accessible to subsequent instructions or for writing to memory 1204 or storage 1206; or any other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs), be a multi-core processor, or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described in further detail below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
an inertial measurement unit;
a lidar sensor; and
one or more processors configured to perform operations comprising:
receiving data from the lidar sensor;
determining movement data based on the data received from the lidar sensor, the movement data comprising a first rotational measurement of the lidar sensor;
receiving data from the inertial measurement unit;
determining, based on the movement data and the data received from the inertial measurement unit, one or more calibration factors for calibrating the inertial measurement unit, wherein determining the one or more calibration factors comprises calculating, based on the first rotational measurement, a scale factor for a second rotational measurement received from the inertial measurement unit; and
applying the one or more calibration factors to a measurement received from the inertial measurement unit.

2. The system of claim 1, wherein:
the movement data comprises a first translational acceleration measurement; and
determining, based on the movement data and the data received from the inertial measurement unit, one or more calibration factors for the inertial measurement unit further comprises calculating, based on the first translational acceleration measurement, a bias for a second translational acceleration measurement received from the inertial measurement unit.

3. The system of claim 1, wherein the first rotational measurement or second rotational measurement comprises a rotational rate measurement.

4. The system of claim 1, wherein:
the lidar sensor and the inertial measurement unit are associated with a vehicle, and
determining, based on the movement data and the data received from the inertial measurement unit, one or more calibration factors for the inertial measurement unit further comprises:
determining, based on the movement data, that the vehicle is stationary; and
determining, based on data received from the inertial measurement unit, a translational bias detected by the inertial measurement unit.

5. The system of claim 1, wherein:
the lidar sensor and the inertial measurement unit are included in a shared housing of a movement measurement unit; and
the inertial measurement unit is coupled with the lidar sensor such that the lidar sensor and inertial measurement unit rotate together.

6. The system of claim 5, wherein the inertial measurement unit is mounted on top of the lidar sensor; and
rotation of the inertial measurement unit and the lidar sensor is driven by a shared motor.

7. The system of claim 5, wherein:
the lidar sensor comprises an optical encoder that measures a rotational rate of the lidar sensor; and
determining, based on the movement data and the data received from the inertial measurement unit, one or more calibration factors for the inertial measurement unit further comprises determining a scale factor between a first rotational rate received from the optical encoder of the lidar sensor and a second rotational rate received from the inertial measurement unit.

8. The system of claim 1, wherein the inertial measurement unit and lidar sensor share a clock signal.

9. The system of claim 1, wherein the processors are further configured to perform operations comprising:
determining, based on the movement data, that the lidar sensor is stationary; and
causing the inertial measurement unit to become coupled with the lidar sensor such that the lidar sensor and the inertial measurement unit rotate together, wherein the one or more processors are configured to determine the scale factor for the second rotational measurement of the inertial measurement unit after causing the inertial measurement unit to become coupled with the lidar sensor.

10. The system of claim 9, wherein the processors are further configured to perform operations comprising:
causing the inertial measurement unit to become decoupled from the lidar sensor, such that the lidar sensor and the inertial measurement unit no longer rotate together.

11. The system of claim 1, wherein applying the one or more calibration factors to the measurement received from the inertial measurement unit comprises:
identifying the measurement from data received from the inertial measurement unit;
calculating a calibrated measurement based on the one or more calibration factors and the measurement; and
substituting the calibrated measurement for future uses of the measurement.

12. One or more computer-readable non-transitory storage media embodying software that is operable when executed to cause one or more processors to perform operations comprising:
receiving data from a lidar sensor;
determining movement data based on the data received from the lidar sensor, the movement data comprising a first rotational measurement of the lidar sensor;
receiving data from an inertial measurement unit;
determining, based on the movement data and the data received from the inertial measurement unit, one or more calibration factors for calibrating the inertial measurement unit wherein determining the one or more calibration factors comprises calculating, based on the first rotational measurement, a scale factor for a second rotational measurement received from the inertial measurement unit; and applying the one or more calibration factors to a measurement received from the inertial measurement unit.

13. The one or more computer-readable non-transitory storage media of claim 12, wherein:
the movement data comprises a first translational acceleration measurement; and
determining, based on the movement data and the data received from the inertial measurement unit, one or more calibration factors for the inertial measurement unit further comprises calculating, based on the first translational acceleration measurement, a bias for a second translational acceleration measurement received from the inertial measurement unit.

14. The one or more computer-readable non-transitory storage media of claim 12, wherein the first rotational measurement or second rotational measurement comprises a rotational rate measurement.

15. The one or more computer-readable non-transitory storage media of claim 12, wherein:
the lidar sensor and the inertial measurement units are associated with a vehicle, and
determining, based on the movement data and the data received from the inertial measurement unit, one or more calibration factors for the inertial measurement unit further comprises:
  determining, based on the movement data, that the vehicle is stationary; and
  determining, based on data received from the inertial measurement unit, a translational bias detected by the inertial measurement unit.

16. The one or more computer-readable non-transitory storage media of claim 12, wherein:
the lidar sensor and the inertial measurement unit are included in a shared housing of a movement measurement unit; and
the inertial measurement unit is coupled with the lidar sensor such that the lidar sensor and the inertial measurement unit rotate together.

17. A method by a computing system, comprising:
receiving data from a lidar sensor;
determining movement data based on the data received from the lidar sensor, the movement data comprising a first rotational measurement of the lidar sensor;
receiving data from an inertial measurement unit;
determining, based on the movement data and the data received from the inertial measurement unit, one or more calibration factors for calibrating the inertial measurement unit, wherein determining the one or more calibration factors comprises calculating, based on the first rotational measurement, a scale factor for a second rotational measurement received from the inertial measurement unit; and
applying the one or more calibration factors to a measurement received from the inertial measurement unit.

18. The method of claim 17, wherein:
the movement data comprises a first translational acceleration measurement; and
determining, based on the movement data and the data received from the inertial measurement unit, one or more calibration factors for the inertial measurement unit further comprises calculating, based on the first translational acceleration measurement, a bias for a second translational acceleration measurement received from the inertial measurement unit.

19. The method of claim 17, wherein the first rotational measurement or second rotational measurement comprises a rotational rate measurement.

20. The method of claim 17, wherein:
the lidar sensor and the inertial measurement units are associated with a vehicle; and
determining, based on the movement data and the data received from the inertial measurement unit, one or more calibration factors for the inertial measurement unit further comprises:
  determining, based on the movement data, that the vehicle is stationary; and
  determining, based on data received from the inertial measurement unit, a translational bias detected by the inertial measurement unit.

* * * * *

UNITED STATES PATENT AND TRADEMARK OFFICE
CERTIFICATE OF CORRECTION

PATENT NO. : 11,209,456 B2
APPLICATION NO. : 16/283529
DATED : December 28, 2021
INVENTOR(S) : Jonathan Oliver Nichols and Mayur Nitinbhai Shah Page 1 of 1

It is certified that error appears in the above-identified patent and that said Letters Patent is hereby corrected as shown below:

In the Claims

Column 26, Lines 9-10, In Claim 5, replace "lidar sensor and inertial measurement unit" with -- lidar sensor and the inertial measurement unit --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*